United States Patent [19]

Carter, Jr., deceased et al.

[11] 4,263,864
[45] Apr. 28, 1981

[54] BUOYANT NET AND RETRIEVAL DEVICE

[76] Inventors: Roy N. Carter, Jr., deceased, late of Portsmouth, Va.; Doris E. Carter, administratrix, 601 7th St., Portsmouth, Va. 23704

[21] Appl. No.: 13,500

[22] Filed: Feb. 21, 1979

[51] Int. Cl.³ .............................................. B63B 17/00
[52] U.S. Cl. .................................... 114/221 R; 43/12; 294/24; 294/26; 403/103
[58] Field of Search ......................... 43/11, 12; 9/400; 114/221 R; 294/53.5, 24, 26; 285/354; 403/288, 84, 100, 103

[56] References Cited

U.S. PATENT DOCUMENTS

| 737,428 | 8/1903 | Lindsey et al. | 43/12 |
|---|---|---|---|
| 956,803 | 5/1910 | Fromm | 43/12 |
| 1,921,323 | 8/1933 | Purdon | 43/12 |
| 2,685,460 | 8/1954 | Ogborn et al. | 285/354 X |
| 2,939,238 | 6/1960 | Ertel et al. | 43/11 |
| 3,030,725 | 4/1962 | Sandul | 43/12 |
| 3,106,419 | 10/1963 | Estwing | 294/26 X |

FOREIGN PATENT DOCUMENTS 1032942  6/1966  United Kingdom ....................... 403/84

Primary Examiner—Sherman D. Basinger
Attorney, Agent, or Firm—Dowell and Dowell

[57] ABSTRACT

An extensible-handle buoyant net and retrieval device having a handle member made of telescoping tubes sealed at their joints by a packing gland, the handle member being sealed at one end by an inserted hook member and carrying a fork member at its other end, the fork member having a block pivotally connected thereto supporting a net frame, and the fork member and block forming a pivotal joint carrying a lock for fixing the angle of the net frame to a selected one of multiple predetermined angular positions, the frame and handle members being made of hollow plastic tubing.

2 Claims, 3 Drawing Figures

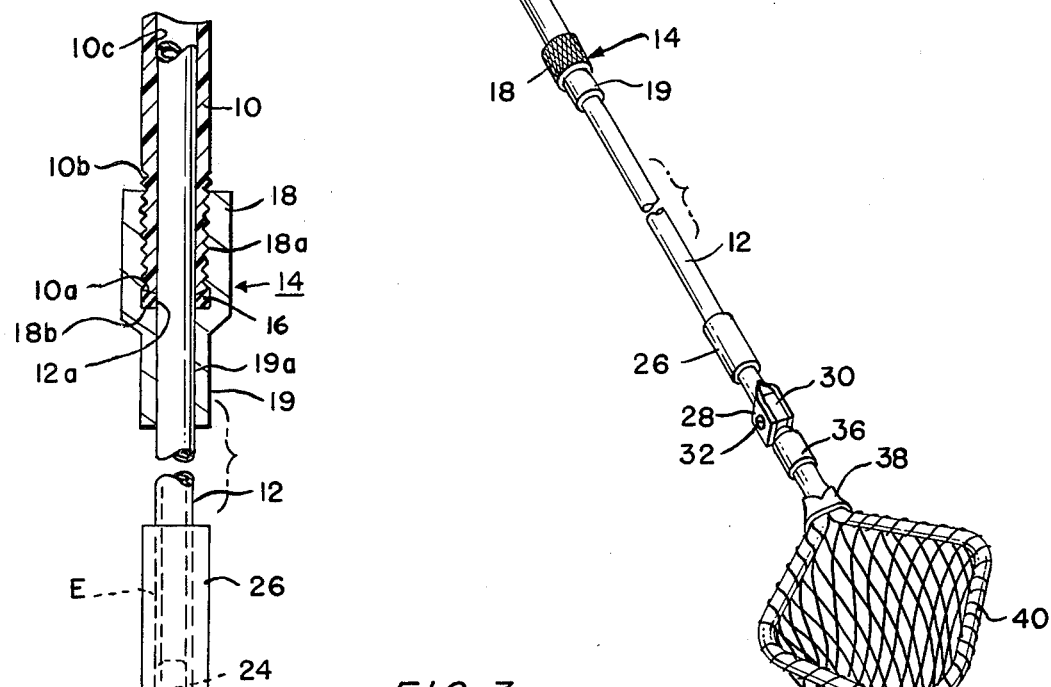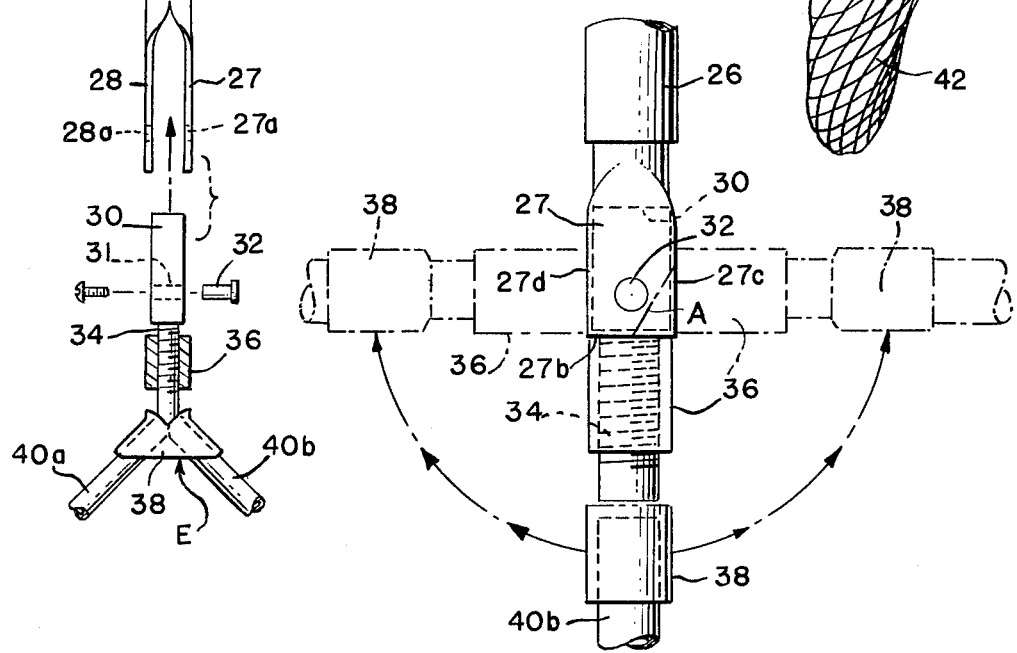

BUOYANT NET AND RETRIEVAL DEVICE

FIELD OF INVENTION

This invention relates to netting and hooking devices of a type particularly useful in and around boats for catching sea life and for retrieving objects lost overboard, and more particularly relates to an improved device having several features of adjustability, and provided with positive flotation so that if lost overboard the device will have the required buoyancy to float on the surface.

BACKGROUND AND PRIOR ART

The prior art shows a number of patents in which either the handle or the net supporting frame can be adjusted to different positions, some of the patents showing means for making both such adjustments. For instance, provision for adjusting the plane of the net supporting frame with respect to the position of the handle is illustrated in U.S. Pat. No. 956,803 to Fromm; U.S. Pat. No. 737,428 to Lindsey et al; U.S. Pat. No. 3,030,725 to Sandul; and U.S. Pat. No. 2,939,238 to Ertel et al. However, none of these patents shows a frame position adjusting joint which is structurally similar to that shown in the present disclosure.

The above mentioned U.S. Pat. Nos. 737,428 and 956,803 and 3,030,725 as well as U.S. Pat. No. 1,921,323 to Purdon, all show means for changing the length of the handle. In U.S. Pat. Nos. 737,428 and 956,803 the handles are made as plural separate rods which are provided with threaded joints by which they may be screwed together in order to achieve a desired length, or separated in order to facilitate storage. On the other hand, U.S. Pat. Nos. 1,921,323 and 3,030,725 show telescoping handle sections which can be housed one inside the other in order to achieve adjustability as to length. In U.S. Pat. No. 1,921,323 a spring is used for the purpose of projecting the handle sections to their maximum extension, but no means is shown for achieving flotation using said hollow handles, and no means is shown for adjusting the length between fully retracted and fully extended positions. In Sandul U.S. Pat. No. 3,030,725 there are certain fixed detent positions labelled 15, 16 and 17 into which the handles may be selectively adjusted, but no intermediate adjustment is possible. In addition, only one of the sections of the handle 14 is usable for flotation purposes because of the kind of detent arrangement employed in the handle. The section 14 has plugs 19 and 20 at the two ends thereof, but the larger section 13 is open, and indeed, cannot be made watertight because of the detent holes 15, 16 and 17.

THE INVENTION

The buoyant net and retrieval device according to the present invention includes two telescopically oriented plastic tubes joined by a combined packing gland and locking ferrule which makes the separate handle tubes infinitely adjustable between fully retracted and fully extended positions while excluding water from the interiors of both tubes, the other ends of which are plugged. The device has a hook member at one end useful for general retrieval purposes or useful as a boat hook, and at the other end of the handle there is located a fork member into which a block which carries the frame of the net is pivotally connected, the fork member having spaced pivot plates which not only serve to support the pivot pin, but also provide flat edges against which a locking collar can be screwed, the locking collar being carried on a threaded portion of the block. This locking means gives at least three different positions into which the net frame can be moved and locked by the sleeve, although more or fewer positions are possible with this design. For instance, one of the transversely facing flat edges might be cut at an acute angle to the axis of the handle, whereby the net frame could also be locked in an acute angle position with respect to the handle.

It is a principal object of this invention to provide an improved net and retrieval device suitable for use around boats or for fishing purposes, most of the structure being made of plastic tubing or plastic blocks, and the engagements of the threaded adjustments such as the handle adjusting ferrule or the angle locking sleeve comprising engagements of metal parts upon plastic threads, thereby eliminating the liklihood of seizing of two parts together, for instance by corrosion as would be more likely to occur if the parts comprised metal on metal engagements.

It is another important object of this invention to provide a net and retrieval device in which both handle sections are used as flotation chambers from which water is carefully excluded by suitable sealing means. It is to be understood that the handle is not limited to any particular number of telescopic sections, but that the number of sections may be chosen to suit the needs of the user.

Still another object of the invention is to provide a net and retrieval device in which twisting of the handle relative to the net frame is not required in order to lock or unlock the angular position of the net frame, or to lock or unlock handle joints, whereby the connection of the handle to the frame is immune from accidental twisting which would produce loosening of the adjustments.

Still a further object of the invention is to provide an improved net frame angle adjustment structure in which the locking sleeve performs no other function than to lock the position of the net frame about its pivotal connection with the handle, and in which the accidental loosening of the locking sleeve does not immediately free the net from its locked position, whereby the user will be warned of looseness before the looseness reaches a degree which may cause loss of the contents of the net.

Yet a further object of the invention is to provide a device in which the plastic parts can be made of well known common tubing which can be secured together using epoxy cement, such plastics being in common use at the present time as cold water pipes and drainpipes.

Another object of the invention is to provide a net frame which is essentially rectangular when viewed perpendicular to the plane of the frame, thereby making it easier to maneuver the frame into right-angle corners, and into smaller spaces than could be successfully performed using the conventional circular net frame.

It is the general object of this invention to provide an improved device for use in crabbing and fishing, which device may also support other accessories used by sportsmen, such as boat hooks and general lost-object retrieval devices.

Other objects and advantages of the invention will become apparent during the following discussion of the drawings:

THE DRAWINGS

FIG. 1 is a perspective view of the buoyant net and retrieval device according to the invention;

FIG. 2 is an exploded elevation view, partly in cross-section, showing a portion of the handle and the pivotal joint connecting the net frame thereto; and FIG. 3 is an enlarged partial view of the pivotal joint taken at 90° with respect to the view of FIG. 2 and showing the block pivoted into several different dashed-line positions.

FIG. 1 shows the assembled device which comprises two mutually telescoping tubes 10 and 12, the latter being smaller in diameter and sliding inside of the former. These tubes are preferably hollow plastic tubes which may be of the type used for plumbing. The two tubes together form the handle of the device, and they are connected together at a packing-gland joint 14 which is used to pack the space between the two tubes to prevent the entrance of water therebetween, the joint being tightenable to lock the two tubes together with the degree of elongation selected before tightening of the joint 14, which is shown in cross-section in FIG. 2.

The joint 14 comprises a packing gland having an elastomeric seal ring 16 abutting the end 10a of the tube 10 and squeezing down tightly against the outer periphery 12a of the tube 12. The tube 10 is threaded as at 10b and receives a metal ferrule 18 which is internally threaded as at 18a to engage the threads 10b of the tube 10. The lower portion of the ferrule which is identified by the reference numeral 19 is somewhat reduced in size and the ferrule has a bore 19a which snugly receives the outer surface 12a of the tube 12. When the ferrule is tightened on the threads 10b, the end surface 10a of the tube 10 compresses the elastomeric packing 16 against the shoulder 18b so that it is displaced inwardly to seal the outer surface 12a of the tube 12 both for mechanical locking of the joint and also for the exclusion of water from the handle.

The upper end of the tube 10 is provided with a hollow hook-shaped retrieval member 20 which may be made of bent aluminum tubing. This hook-shaped member 20 is of such size as to fit snugly in the bore 10c of the tube 10, and is epoxyed in place therewithin. For the purpose of excluding water from the inside of the hook member 20 and the tube 10, a plug 22 is inserted in the open end of the hook member to seal it. The lower end of the tube 12 is closed by a plug 24 which can be seen in FIG. 2. The entire handle portion including the tubes 10, 12 and 20 therefore comprises a flotation chamber from which water is excluded at both ends by the plugs 22 and 24 and is excluded from entry at the ferrule joint 14 by the packing 16 located therewithin.

The lower end of the tube 12 is epoxyed in the internal bore of a fork member 26 having two downwardly extending pivot plates 27 and 28 with aligned holes 27a and 28a. A block 30 having a hole 31, as shown in FIG. 2, is entered between the two pivot plates 27 and 28, and is pivotally connected thereto by a pivot pin 32 which is visible in all three figures, the pin 32 transfixing the pivot plates 27 and 28 and the block 30 so that the block can pivot between the plates through a variety of positions, three of which are shown in FIG. 3. The block 30 has a threaded portion 34 on which is attached a sleeve 36 for the purpose hereinafter discussed. Finally, the block 30 supports a socket member 38 which as seen in FIG. 2 is wide enough to receive both ends of the frame 40 of the crab net. This frame is also made of a length of plastic tube which is bent to provide an approximately rectangular opening around which the crab netting 42 is secured in a manner well known in the art. The two ends 40a and 40b of the frame are secured in the socket 38 by suitable means, such as by epoxy cement E, and sufficient cement is used in the socket 38 to fill the socket completely whereby water is also excluded from the frame tube 40 so that it is also buoyant when immersed in water. The epoxy used to join others of the various members together is also referred to by the reference numeral E.

Referring again to the pivotal joint which appears in FIGS. 2 and 3, the crab net frame can be moved to one of three different positions and locked in that position using the sleeve 36. It will be noted that each of the pivot plates 27 and 28 has three flat faces. The plate shown in FIG. 3 is typical and includes an end-wise facing flat face 27b and two transversely extending flat faces 27c and 27d. The plate 28 is similarly shaped. As shown in FIG. 3, as long as the sleeve 36 is screwed up tightly against one of these three flat edges, the block 30 carrying the socket 38 cannot be pivoted about the pin 32. However, if the sleeve is unscrewed away from the flat edge as shown in FIG. 1, then the block 30 and socket 38 can be pivoted about the pivot pin 32 to any one of the three positions shown in FIG. 3, the alternative two positions being shown in dashed lines. When the sleeve 36 is retightened against the adjacent edges of the pivot plates 27 and 28, the joint carrying the net frame 40 is then locked in the position selected. The moving of the net frame 40 into one of the transverse positions as shown in dashed lines in FIG. 3 makes the net particularly useful for picking up objects which are directly beneath the user, or for picking crabs off of vertical surfaces of piling. The edges 27b and 27d need not be rectangularly oriented. For instance a diagonal edge as represented by the dashed line A in FIG. 3 would allow the user to set the net frame at an acute angle with respect to the handle.

The hook member 20 located at the upper end of the handle tube 10 is particularly useful not only for hanging up the device and for holding it when a person has the handle members fully extended, but can also be used for a boat hook or as hook to retrieve objects or persons lost overboard.

This invention is not to be limited to the exact form shown in the drawings, for obviously changes may be made within the scope of the following claims.

I claim:

1. A buoyant net and object retrieval device, comprising:
   (a) a handle member sealed at both ends and having multiple mutually telescoping rigid plastic tubes, the larger tube at each telescoping junction of tubes being externally threaded;
   (b) packing gland means at the junction between adjacent tubes, each packing gland means comprising a cylindrical metal body having a bore with a shoulder therein stepping the bore down from the diameter of the larger tube to that of the adjacent smaller tube, and the larger bore being threaded to screw onto the externally threaded tube and the smaller bore extending along the smaller tube beyond the shoulder, and packing means compressible between said shoulder and the end of the larger tube, the gland means being adjustable to seal the junction against entry of water and to lock the adjacent tubes together;

(c) a fork member attached to one end of the handle member and having two pivot plates extending away from the handle in parallel spaced relationship;

(d) a block member having one end extending between the plates and pivoted thereto by a pivot pin, and having a second end joined nonrotatively to the first end and spaced therefrom by a threaded neck;

(e) the pivot plates having multiple straight locking edges, the locking edges on one plate being similar to and parallel to the locking edges on the other plate, and the threaded neck supporting a mating threaded sleeve, and said sleeve being positionable on said neck threads selectively to space the sleeve from the locking edges to permit pivoting of the block member about the pin or to tighten the sleeve against adjacent edges of the plates to lock the block member in a selected position; and (f) a net supporting frame member fixed to said second end of the block member, the frame member being made of rigid plastic tubing sealed at its ends and bent to form a substantially rectangular net opening shape, one corner of the frame member being fixed to said second end of the block member.

2. The device as claimed in claim 1, further comprising a hook member inserted in the handle member at the other end thereof from the fork member and sealing that end, the hook member comprising a bent tube having a plug in its free end.

* * * * *